US010466940B2

(12) United States Patent
Morimoto

(10) Patent No.: US 10,466,940 B2
(45) Date of Patent: Nov. 5, 2019

(54) REDIRECTING TRANSMISSION OF CONTENT FROM FIRST HTTPS ADDRESS TO SECOND HTTPS ADDRESS

(71) Applicant: CANON KABUSHIKI KAISHA, Tokyo (JP)

(72) Inventor: Hiroaki Morimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/968,948

(22) Filed: May 2, 2018

(65) Prior Publication Data
US 2018/0329657 A1 Nov. 15, 2018

(30) Foreign Application Priority Data
May 10, 2017 (JP) .................. 2017-094084

(51) Int. Cl.
G06F 3/12 (2006.01)
H04L 29/08 (2006.01)
H04L 29/12 (2006.01)

(52) U.S. Cl.
CPC .......... G06F 3/1207 (2013.01); G06F 3/1231 (2013.01); G06F 3/1232 (2013.01); G06F 3/1273 (2013.01); H04L 61/1535 (2013.01); H04L 61/2503 (2013.01); H04L 67/02 (2013.01)

(58) Field of Classification Search
CPC .... G06F 3/1207; G06F 3/1231; G06F 3/1273; H04L 61/1535
See application file for complete search history.

(56) References Cited

U.S. PATENT DOCUMENTS

| 6,209,048 | B1 | 3/2001 | Wolff | |
| 6,738,841 | B1 | 5/2004 | Wolff | |
| 7,904,502 | B2 | 3/2011 | Wolff | |
| 8,903,946 | B1* | 12/2014 | Roskind | ............ G06F 17/30902 709/217 |
| 2004/0146327 | A1* | 7/2004 | Hata | ...................... B41J 29/393 400/76 |
| 2007/0185885 | A1* | 8/2007 | Tamura | ............. G06F 17/30011 |

FOREIGN PATENT DOCUMENTS

JP 2007018535 A 1/2007

* cited by examiner

Primary Examiner — Eric A. Rust
(74) Attorney, Agent, or Firm — Venable LLP

(57) ABSTRACT

There is provided a communication apparatus that determines whether transmission of data to a transmission destination by a communication function satisfies a predetermined condition concerning data transmission, and controls the communication function such that upon determining that the predetermined condition is satisfied, a signal that does not include the data is transmitted to the transmission destination, and upon determining that the predetermined condition is not satisfied, a signal including the data is transmitted to the transmission destination. If a response to instruct transfer of the signal from the transmission destination to another transmission destination is received in accordance with the transmission of the signal to the transmission destination, the communication apparatus controls the communication function such that the signal including the data is transmitted to the other transmission destination.

24 Claims, 11 Drawing Sheets

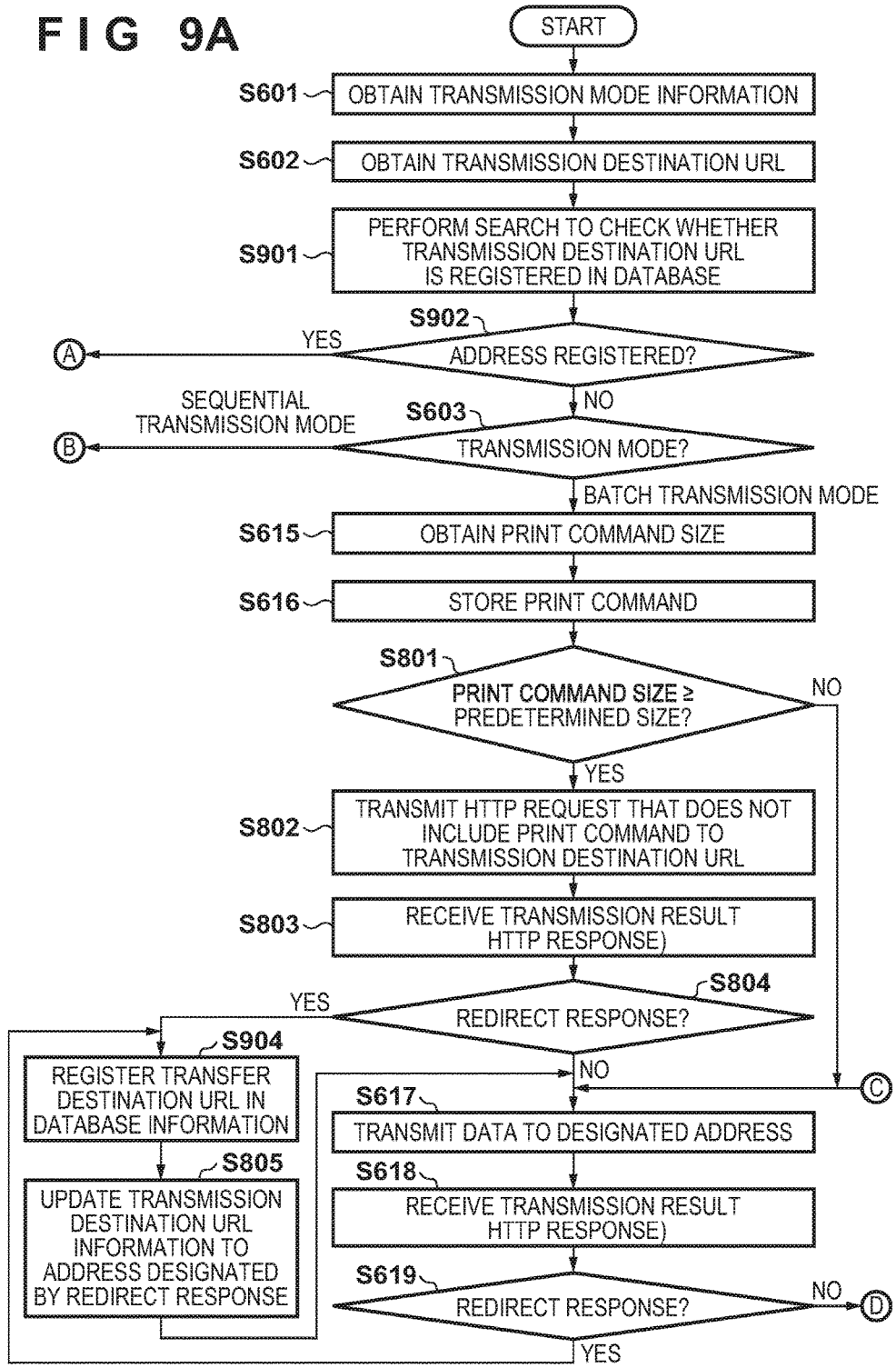

FIG 10

| TRANSMISSION DESTINATION URL | TRANSFER DESTINATION URL |
|---|---|
| foo bar port1 | foo bar port2 |
| foo bar port3 | foo bar port4 |
| foo bar port5 | foo bar port6 |

REDIRECTING TRANSMISSION OF CONTENT FROM FIRST HTTPS ADDRESS TO SECOND HTTPS ADDRESS

BACKGROUND OF THE INVENTION

Field of the Invention

The present invention relates to a signal transmission technique in a communication network.

Description of the Related Art

As a protocol used to perform communication between an information processing apparatus (host) and a web server or communication between peripheral devices equipped with a web server function, Hyper Text Transfer Protocol (to be referred to as "HTTP" hereinafter) is known. HTTP can be used to transmit/receive various kinds of contents on a network. Japanese Patent Laid-Open No. 2007-018535 describes a method in which an apparatus uses HTTP to control a peripheral device.

Upon receiving an HTTP request from a host, a web server determines whether a resource placed at a designated Uniform Resource Locator (to be referred to as "URL" hereinafter) is transferred from the designated URL to another URL. Upon determining that the resource is transferred to the other URL, the web server can return an HTTP response including the URL of the transfer destination as a response. Such an HTTP response including the URL of a transfer destination will be referred to as a redirect response hereinafter. Upon receiving a redirect response, the host transmits the HTTP request again to the URL of the transfer destination designated in the redirect response.

The web server cannot transmit the HTTP response until all HTTP requests are received. In addition, the host can transmit further transmission target data to the web server in addition to the HTTP request using the POST method. In this case, the web server transmits the HTTP response to the host after all data including the transmission target data are received. Hence, since the host prepares for, for example, reception of a redirect response from the web server, the processing load in the host may increase.

SUMMARY OF THE INVENTION

The present invention suppresses a waste of a resource associated with communication.

According to one aspect of the present invention, there is provided a communication apparatus comprising: a first transmission unit configured to transmit, to a first address, a communication request that does not include a content; and a second transmission unit configured to, if a redirect response representing transfer to a second address different from the first address is received as a response to the communication request that does not include the content, transmit the content to the second address included in the response.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 9A and 9B illustrate a flowchart showing the third example of processing of the HTTP communication module; and FIG. 10 is a conceptual view of a transfer destination URL database.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise. In addition, the following embodiments are shown for the purpose of exemplification, and some of the exemplified arrangements or steps of a method may be omitted, or an arrangement or step that is not exemplified may be added. Furthermore, in an arrangement to be described below, two or more blocks may be integrated, or one block may be divided into two or more blocks. The order of steps of a method may be reversed in a possible range, or the steps may be executed simultaneously.

(System Arrangement)

Figure 1:
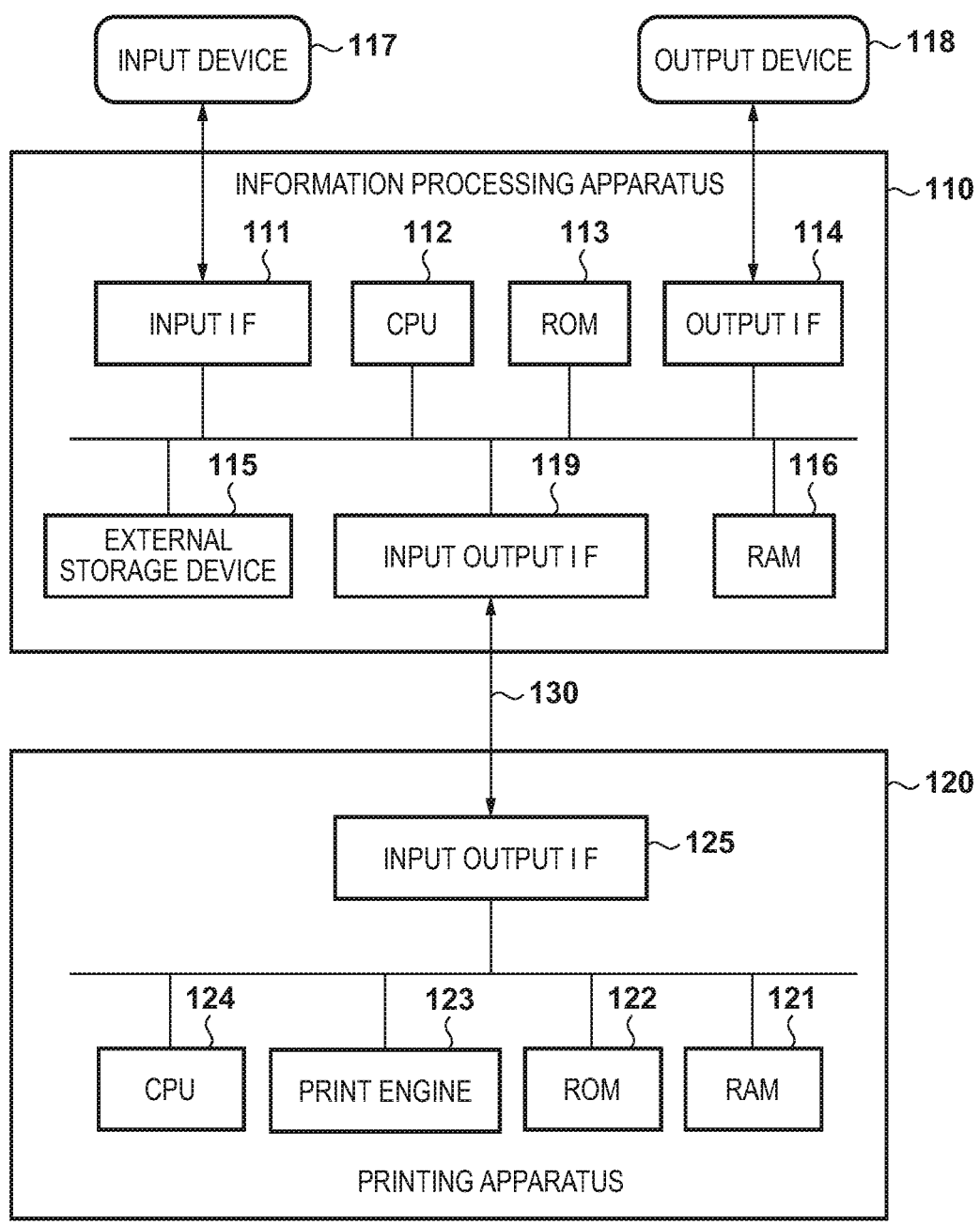
FIG. 1 is a block diagram showing an example of the arrangement of a system.

FIG. 1 shows an example of the arrangement of a system according to this embodiment. FIG. 1 shows a printing system including an information processing apparatus 110 and a printing apparatus 120. However, the present invention is not limited to this. That is, the following discussion can be applied to an arbitrary system in which communication is performed between at least two apparatuses, and in some cases, the apparatus on the signal receiving side can designate a transfer destination, and the apparatus on the transmitting side can be caused to transmit a signal to an apparatus at the transfer destination.

In one example, the information processing apparatus 110 includes an input I/F 111, a CPU 112, a ROM 113, an output I/F 114, an external storage device 115, a RAM 116, and an input/output I/F 119. Note that I/F is the acronym of interface. The input I/F 111 is an interface used for communication with an input device 117 that generates and outputs an operation input signal to the information processing apparatus 110. The input device 117 can be for example, a keyboard, a mouse, or the like. The output I/F 114 is an interface used for communication with an output device 118 that outputs information generated in the information processing apparatus 110 or the output device 118 that transmits an output signal. The output device 118 can be, for example, a display configured to display an image, a speaker configured to output a sound, a vibrator configured to output a vibration, or the like. Note that the input device 117 and the output device 118 may be devices externally connected to the information processing apparatus 110 or may be incorporated in the information processing apparatus 110. In addition, the input device 117 and the output device 118 may be formed as one device by a touch panel and the like. The CPU 112 is a central processing unit that executes a program stored in, for example, the ROM 113, thereby executing control of the entire information processing apparatus 110. Note that the CPU 112 may be formed by at least one arbitrary processor such as a microprocessor, an ASIC (Application Specific Integrated Circuit), an FPGA (Field Programmable Gate Array), a DSP (Digital Signal Processor), or the like. Note that the steps of each flowchart (to be described later) executed by the information processing apparatus 110 are implemented when the CPU 112 reads out and executes a program associated with the flowchart. The ROM 113 stores, for example, an initialization program or the like to be executed by the CPU 112 when the information processing apparatus 110 is activated or in accordance with reception of a user operation to execute a predetermined program via the input I/F 111. The external storage device 115 stores at least one of, for example, an operating system (OS), applications, and various kinds of data. The RAM 116 is used as, for example, a work memory when the CPU 112 executes various kinds of programs saved in the external storage device 115. The input/output I/F 119 is an interface used to communicate with another apparatus such as the printing apparatus 120. Note that FIG. 1 shows a diagram in which the input/output I/F 119 of the information processing apparatus 110 appears to be directly connected to an input/output I/F 125 of the printing apparatus 120. However, the present invention is not limited to this. For example, these connections may be established via a network such as a LAN. Note that the connection between the input/output I/F 119 and the input/output I/F 125 of the printing apparatus 120 is established using a wired or wireless channel 130 (in one example, a network cable).

In one example, the printing apparatus 120 includes a RAM 121, a ROM 122, a print engine 123, a CPU 124, and the input/output I/F 125. The CPU 124 is a central processing unit that executes control of the entire printing apparatus 120 in accordance with a control instruction stored in the ROM 122. Note that the CPU 124 can also be at least one arbitrary processor, like the CPU 112. The ROM 122 stores, for example, a control instruction to be executed by the CPU 124. The RAM 121 is used as, for example, the work memory of the CPU 124 and can also be used as a buffer configured to temporarily save received data. The print engine 123 performs print processing based on a print command saved in the RAM 121. Note that the printing apparatus 120 has a redirect function of transferring, for example, a request to a given port to another port. The user can, for example, open a page (remote UI) to control the printing apparatus 120 from a browser operating on the information processing apparatus 110 and switch the redirect function between an enabled state and a disabled state. In addition, the user can also switch the redirect function between the enabled state and the disabled state using the operation panel of the printing apparatus 120. When the redirect function is enabled, for example, the software of the information processing apparatus can be forced to use a specific address or a specific port, and the security level can be improved.

Note that FIG. 1 shows an example of the arrangement. The illustrated arrangement may be partially or wholly replaced with another arrangement having the same function, functions may be added and removed. In addition, some functions of the information processing apparatus 110 may be moved to the printing apparatus 120, and some functions of the printing apparatus 120 may be moved to the information processing apparatus 110.

(Procedure of Print Processing and Communication)

Figure 2:
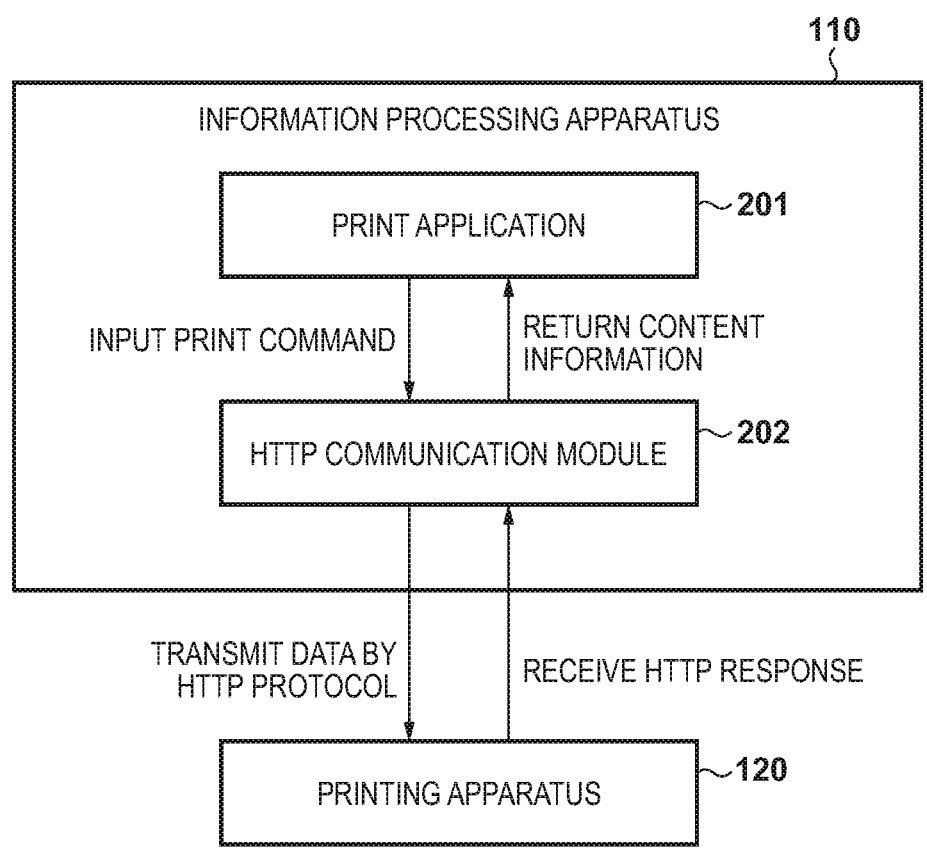
FIG. 2 is a block diagram showing the outline of a function of an information processing apparatus 110 to execute printing.

The outline and the processing procedure when the information processing apparatus 110 executes a print application and transmits a print command to the printing apparatus 120 will be described next. As shown in FIG. 2, in the information processing apparatus 110, in one example, a print application 201 and an HTTP communication module 202 cooperatively execute processing for causing the printing apparatus 120 to execute printing. An example of a method of installing the print application 201 and the HTTP communication module 202 will be described here. For example, installation processing is executed using an installation package including a program associated with the print application 201 and a program associated with the HTTP communication module 202. When the installation processing is executed, the print application 201 and the HTTP communication module 202 are installed in association with each other. The print application 201 converts input data designated by the user into a print command interpretable by the printing apparatus 120, and sequentially inputs the print command to the HTTP communication module 202. The HTTP communication module 202 further converts the received print command into an HTTP request packet and transmits it to the printing apparatus 120. After the HTTP request packet transmitted from the HTTP communication module 202 is received, the printing apparatus 120 transmits information representing whether the reception has succeeded to the HTTP communication module 202 as an HTTP response packet. Upon receiving the HTTP response packet from the printing apparatus 120, the HTTP communication module 202 obtains reception result information included in the HTTP response packet and returns the information to the print application 201. Note that in this embodiment, a description will be made using the print application as software that generates a print command. However, a printer driver may be used in place of the print application.

Figure 3:
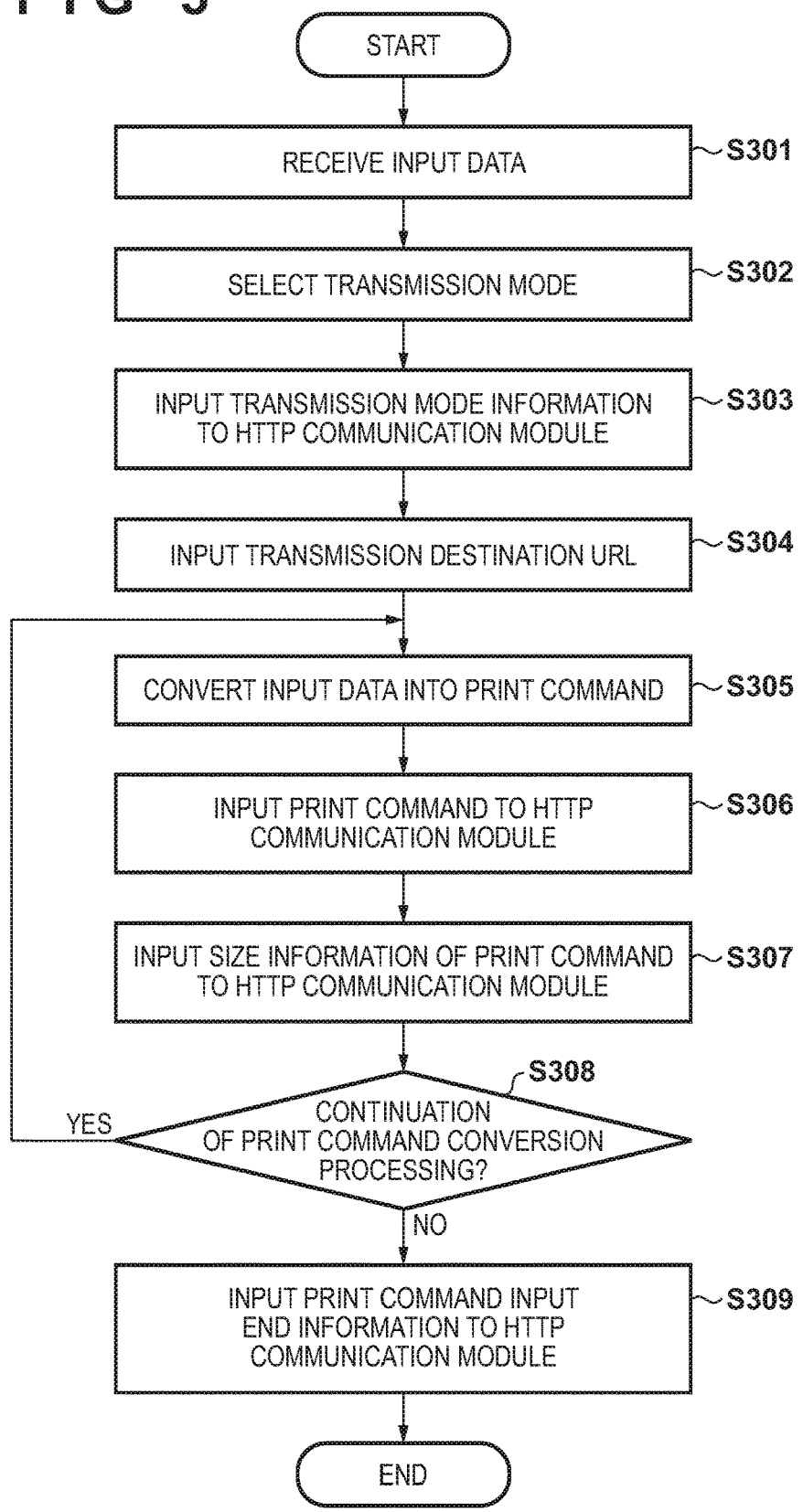
FIG. 3 is a flowchart showing the internal processing of a print application 201.

Processing executed by the print application 201 will be described in detail with reference to FIG. 3. The print application 201 receives input data selected by the user (step S301), and selects a print command transmission mode (step S302). The print command transmission mode includes, for example, a method (batch transmission mode) in which the print application 201 converts all input data into print commands and inputs all the print commands to the HTTP communication module 202 at once. The print command transmission mode also includes a method (sequential transmission mode) in which converted print commands are sequentially input to the HTTP communication module 202. Note that in the batch transmission mode, since all print commands are input to the HTTP communication module 202 at once, the HTTP communication module 202 transmits a signal (HTTP packet) including all the print commands to the printing apparatus 120. On the other hand, in the sequential transmission mode, the HTTP communication module 202 sequentially transmits a signal including a converted print command to the printing apparatus 120. Thus, the batch transmission mode and the sequential transmission mode can be defined, for example, by the operation of the print application 201 or the HTTP communication module 202. Note that the operation modes are not limited to these, and another operation mode may exist.

After that, the print application 201 inputs the selected transmission mode information and the transmission destination URL of the print command to the HTTP communication module 202 (steps S303 and S304). The print application 201 starts conversion processing of the input data received in step S301 into a print command (step S305). The print application 201 inputs the converted print command to the HTTP communication module 202 (step S306), and further inputs the size information of the input print command to the HTTP communication module 202 (step S307). Note that in the batch transmission mode, print command input to the HTTP communication module 202 is performed when the conversion of all input data to print commands is completed. On the other hand, in the sequential transmission mode, print command input is sequentially performed in the order of completion of the conversion from input data to a print command. That is, every time part of input data is converted into a print command, the converted print command is input to the HTTP communication module 202. The print application 201 confirms whether the conversion of all input data to print commands is completed (step S308). If unconverted input data exists (YES in step S308), the process returns to step S305. On the other hand, if the conversion of all input data to print commands is completed (NO in step S308), the print application 201 advances the process to step S309. In step S309, the print application 201 inputs, to the HTTP communication module 202, information representing that the input of print commands to be transmitted has ended, and ends the processing.

Figure 4:
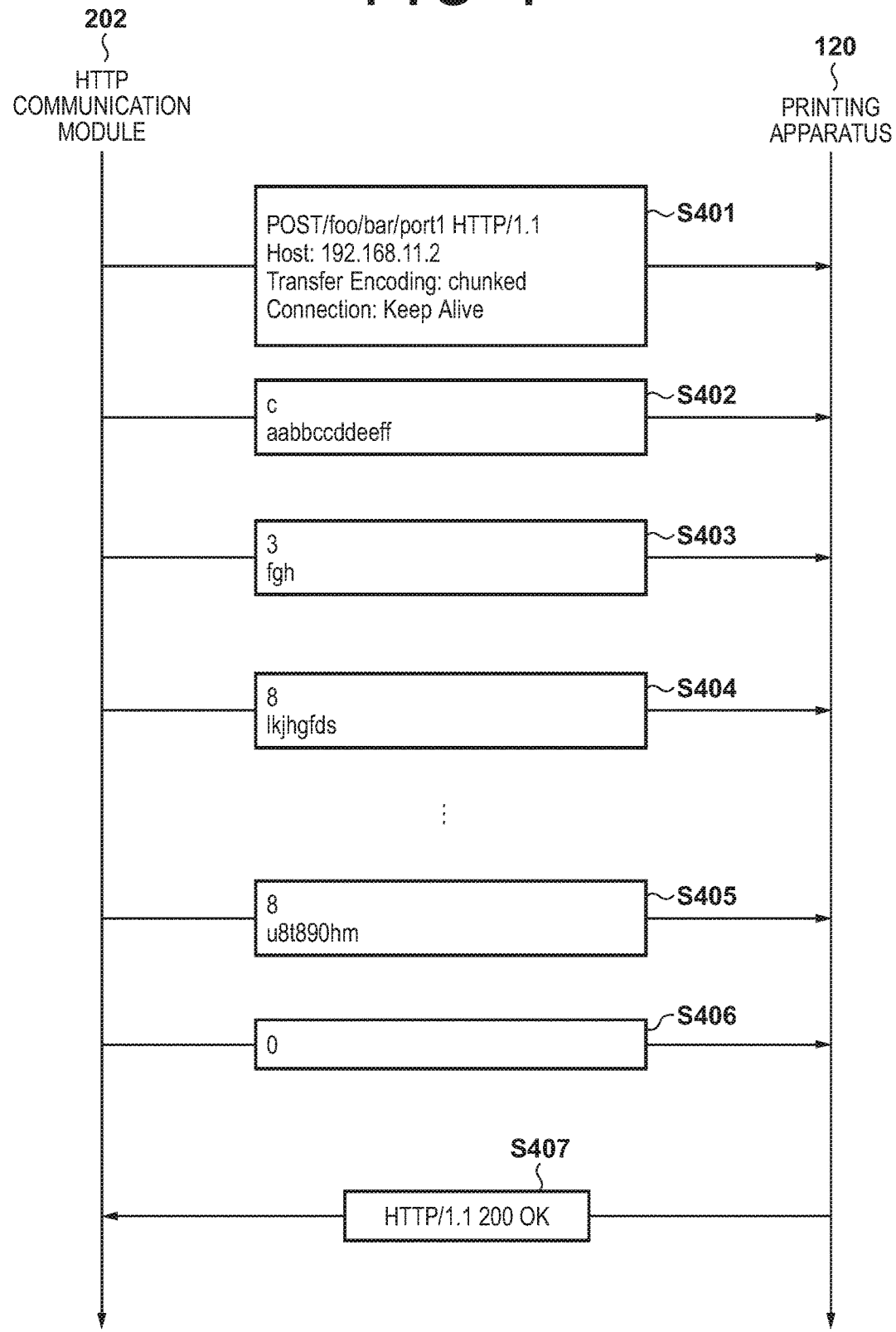
FIG. 4 is a sequence chart showing an example of the procedure of HTTP communication in a sequential transmission mode.

The outline of the procedure of transmission/reception of an HTTP packet between the HTTP communication module 202 and the printing apparatus 120 in the sequential transmission mode will be described next with reference to FIG. 4. The HTTP communication module 202 transmits an HTTP request (HTTP header) in accordance with information input from the print application 201 (step S401). Next, the HTTP communication module 202 sequentially transmits, to the printing apparatus 120, a print command sequentially input from the print application 201 (steps S402 to S405). The data transmitted here sequentially includes, for example, a character string representing the size of actual data to be transmitted by a hexadecimal number and the entity of a print command. For example, in data of step S402, a hexadecimal number "c" represents that the actual data size is "12" in decimals, and the entity of the print command is expressed as a character string of 12 characters "aabbccddeeff". Note that the numbers and the contents of the entity of the command in this data are conceptually represented. For example, each alphabetical letter in the entity of the print command corresponds to actual data in a data amount of a predetermined unit, and the actual data size can be a value based on the data amount of the predetermined unit. When information representing completion of print command input is then received from the print application 201, the HTTP communication module 202 transmits data representing "0" corresponding to data transmission completion from the HTTP communication module 202 to the printing apparatus 120 (step S406). Upon receiving the data in step S406, the printing apparatus 120 transmits information including a status code (200) representing that reception of all print commands has succeeded to the HTTP communication module 202 as an HTTP response (step S407).

Figure 5:
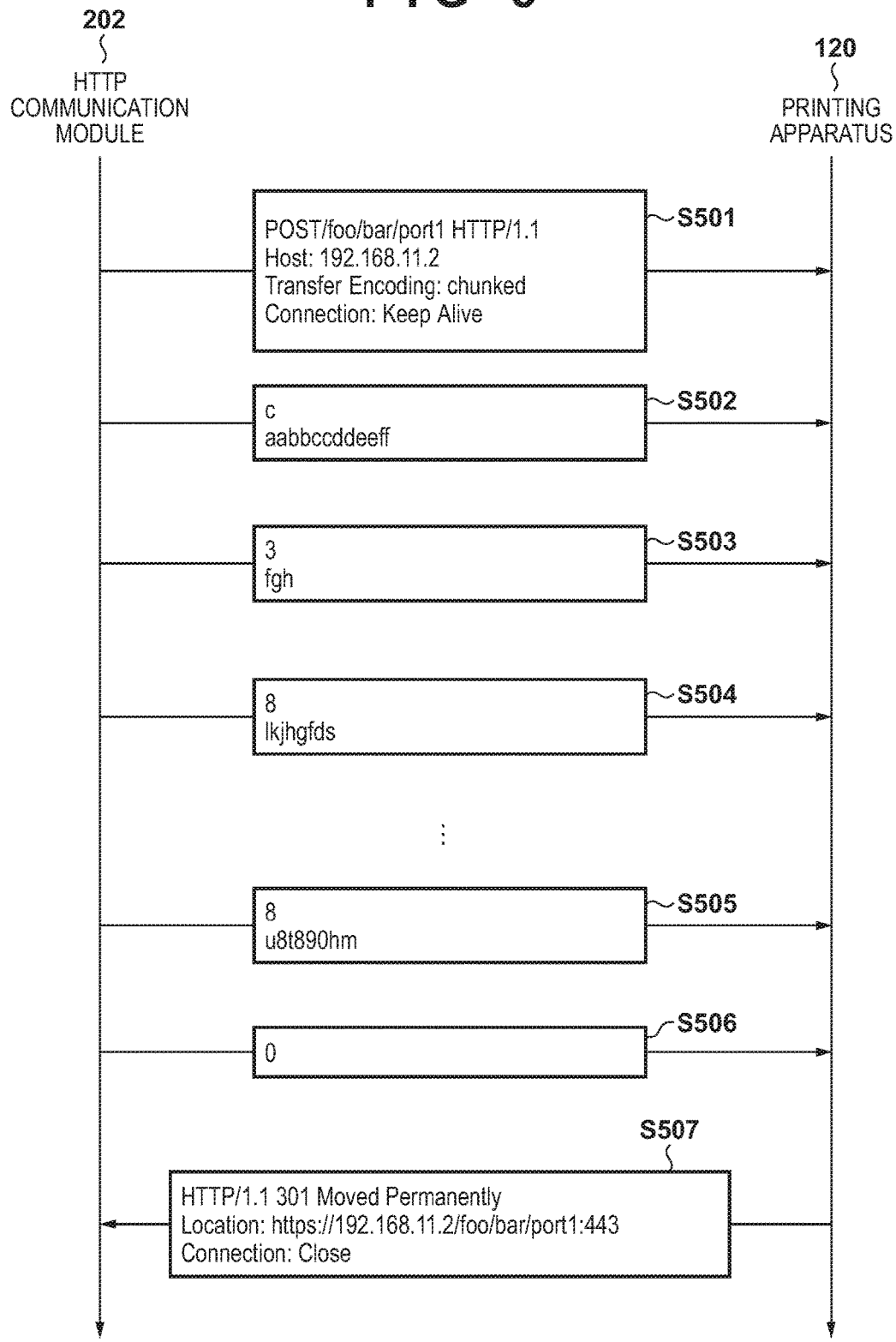
FIG. 5 is a sequence chart showing an example of the procedure of HTTP communication in a case in which a redirect response is generated in the sequential transmission mode.

The procedure of an operation of the printing apparatus 120 to instruct transfer of a print command to another address after reception of all print commands will be described next with reference to FIG. 5. Steps S501 to S506 in FIG. 5 are the same as steps S401 to S406 in FIG. 4, and a description thereof will be omitted. Upon receiving data representing data transmission completion, the printing apparatus 120 transmits an HTTP response including a status code "301" representing that a print command needs to be transferred to another address to the HTTP communication module 202 (step S507). The HTTP response will be referred to as a redirect response hereinafter. The redirect request includes the URL information "Location" of the transfer destination of the print command in addition to the status code "301". Note that FIG. 5 shows an example in which "https://192.168.11.2/foo/bar/port1:443" is included as the URL information of the transfer destination.

In the sequential transmission mode, the HTTP communication module 202 cannot know whether a redirect response is returned from the printing apparatus 120 until transmission of all print commands is completed. For this reason, to retransmit all print commands to the address of the transfer destination in case of reception of a redirect response, the HTTP communication module 202 needs to hold all the print commands until a response from the printing apparatus 120 is received. Hence, the HTTP communication module 202 can consume a larger memory capacity than originally needed. The HTTP communication module 202 can prevent a waste of the memory capacity by regenerating a print command in case of reception of a redirect response from the printing apparatus 120. In this case, however, an operation resource can be wasted. In addition, when a print command is transmitted a plurality of times, a network resource can also be wasted.

Hence, under a predetermined condition that a large memory capacity may be wasted, the HTTP communication module 202 according to the embodiment transmits an HTTP request that does not include a print command before a print command is transmitted, and determines whether redirection occurs. Note that examples of the predetermined condition will be described later. This allows the HTTP communication module 202 to transmit a print command to the URL of the transfer destination without repetitively transmitting the same print command. In addition, it is not necessary to save data in preparation for occurrence of redirection or regenerate data after occurrence of redirection, and it is possible to prevent the memory capacity, the operation resource, and the network resource from being wasted. Several examples of the processing will be described below.

Processing Example 1

The first example of processing executed by the HTTP communication module 202 will be described with reference to FIG. 6. In this processing example, in a case in which the transmission mode is the sequential transmission mode, the HTTP communication module 202 transmits an HTTP request that does not include a print command, and determines based on a received HTTP response whether redirection occurs. The sequential transmission mode can be used to transmit transmission target data divisionally a plurality of times in a case in which the size of the transmission target data is unknown or large. Hence, the processing to be described below can prevent the memory capacity, the operation resource, and the network resource from being largely wasted. Note that a print command is data to be processed by the printing apparatus that is the transmission destination. Hence, a print command will sometimes be referred to as a processing command or processing data.

Figure 6:
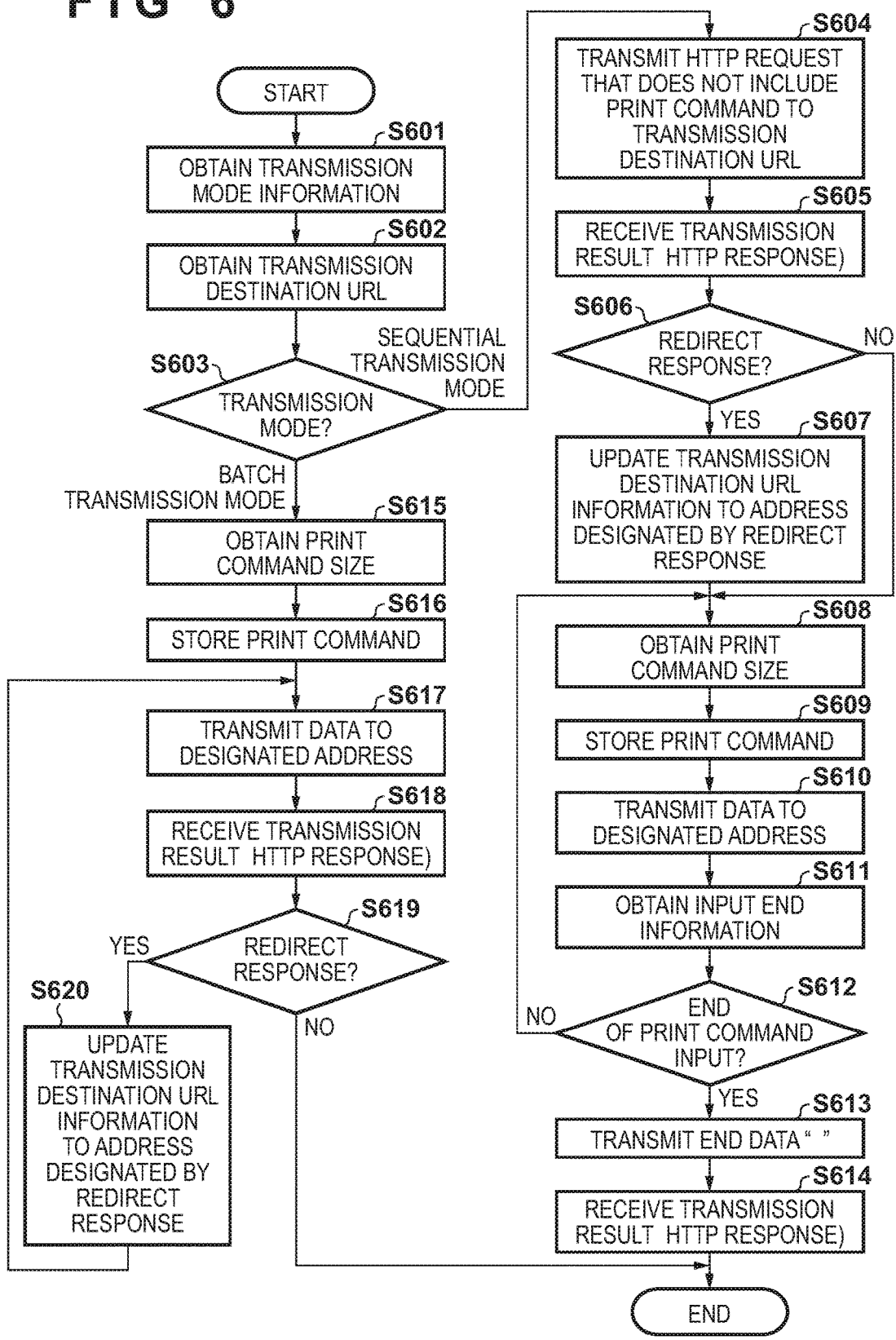
FIG. 6 is a flowchart showing the first example of processing of an HTTP communication module.

Referring to FIG. 6, when processing starts, the HTTP communication module 202 obtains transmission mode information and a transmission destination URL from the print application 201 (steps S601 and S602). Next, the HTTP communication module 202 determines the type of the obtained transmission mode information (step S603). If the obtained information represents the sequential transmission mode, the HTTP communication module 202 advances the process to step S604. On the other hand, if the received information represents the batch transmission mode, the HTTP communication module 202 advances the process to step S615. In step S604, the HTTP communication module 202 transmits an HTTP request that does not include a print command to the transmission destination URL obtained in step S602 (step S604), and receives an HTTP response from the transmission destination URL (step S605). The HTTP communication module 202 analyzes the status code of the received HTTP response and determines whether the HTTP response is a redirect response (step S606). That is, in the sequential transmission mode, the HTTP communication module 202 first transmits an HTTP request that does not include transmission target data such as a print command, and before the transmission target data is actually transmitted, determines whether redirection is performed.

Figure 7:
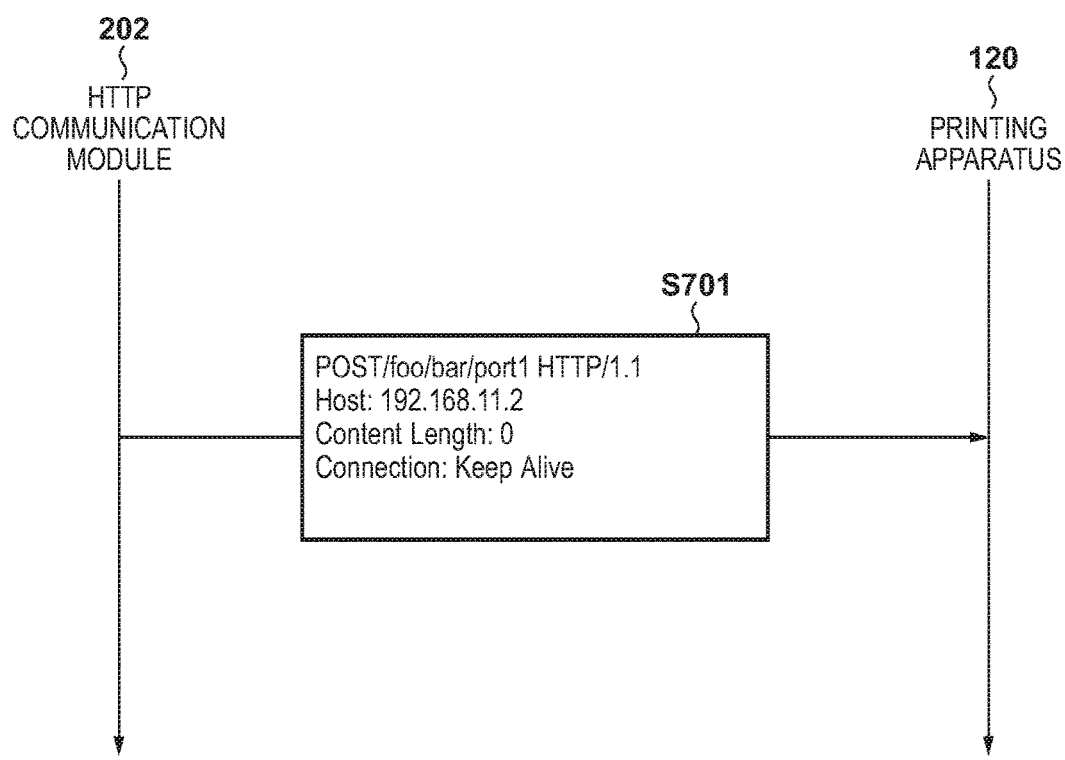
FIG. 7 is a view showing an example of an HTTP request packet that does not include a print command.

Here, FIG. 7 shows an example of the HTTP request (HTTP header) transmitted by the HTTP communication module 202 in step S604. Referring to FIG. 7, "Content-Length:0" in the contents of the HTTP request transmitted in step S701 represents that data to be transmitted is not included except the HTTP header. Thus, in step S604, an HTTP request that does not include transmission data such as a print command is transmitted. Upon receiving the HTTP request, the printing apparatus 120 immediately returns the HTTP response.

Upon determining that the received HTTP response is a redirect response (YES in step S606), the HTTP communication module 202 updates the transmission destination URL obtained in step S603 to a transfer destination URL included in the redirect response (step S607). Next, the HTTP communication module 202 obtains the information of the size of the print command input from the print application 201 (step S608). On the other hand, upon determining that the received HTTP response is not a redirect response (NO in step S606), the HTTP communication module 202 executes the process of step S608 without performing the process of step S607. The HTTP communication module 202 reserves a memory area according to the size obtained in step S608 and stores the print command input from the print application 201 in the area (step S609). After that, the HTTP communication module 202 transmits the print command stored in the memory in step S609 to the transmission destination URL as an HTTP packet (step S610). Then, the HTTP communication module 202 obtains, from the print application 201, information representing whether input of all print commands to be transmitted is completed (step S611), and determines whether input of the print commands is completed (step S612). Upon detecting, in step S612, the information representing that input of all print commands to be transmitted is completed (YES in step S612), the HTTP communication module 202 transmits data representing "0" corresponding to data transmission completion to the transmission destination URL (step S613). Then, the HTTP communication module 202 receives an HTTP response from the transmission destination URL (step S614), and ends the processing. On the other hand, if the information representing that input of all print commands to be transmitted is completed is not detected in step S612 (NO in step S612), the HTTP communication module 202 returns the process to step S608 and repetitively executes the print command transmission processing.

Upon determining in step S603 that the transmission mode is the batch transmission mode, the HTTP communication module 202 obtains the information of the size of the print command input from the print application 201 (step S615). Then, the HTTP communication module 202 reserves a memory area according to the size obtained in step S615 and stores the print command input from the print application 201 in the area (step S616). Next, the HTTP communication module 202 transmits the print command stored in the memory in step S616 to the transmission destination URL (step S617), and receives an HTTP response from the transmission destination URL (step S618). Note that although the transmission destination URL used in step S617 and the URL used in step S610 after the redirection are different, both URLs correspond to the printing apparatus 120. The HTTP communication module 202 analyzes the status code of the received HTTP response and determines whether the HTTP response is a redirect response (step S619). Upon determining that the received HTTP response is a redirect response (YES in step S619), the HTTP communication module 202 updates the transmission destination URL obtained in step S603 to a transfer destination URL included in the redirect response (step S620), and returns the process to step S617. On the other hand, upon determining that the received HTTP response is not a redirect response (NO in step S619), the HTTP communication module 202 ends the processing.

By the processes of steps S604 to S606, the HTTP communication module 202 can detect the presence/absence of a redirect response before the start of transmission of the print command (transmission target data or processing data). Accordingly, the HTTP communication module 202 can transmit the print command to an appropriate transmission address from the first transmission, and a plurality of times of transmission processing for a plurality of addresses by redirection are not performed. That is, it is possible to prevent the network resource from being wasted. In addition, the HTTP communication module 202 need not hold all the print commands received from the print application 201, and the memory capacity consumption can be reduced.

Processing Example 2

In Processing Example 1, when the print application 201 selects the batch transmission mode, the HTTP communication module 202 transmits an HTTP request including a print command independently of the contents of the print command. In this case, if a redirect response is received, the HTTP communication module 202 retransmits the print command to a transfer address designated by the redirect response. For this reason, a data communication amount twice larger than the originally needed data transfer amount is necessary. Hence, if the size of the transmission target data is large, the network resource can be wasted. In this processing example, in the batch transmission mode, if the size of a print command is a predetermined size or more, the HTTP communication module 202 transmits an HTTP request that does not include the print command to the transmission destination URL. The HTTP communication module 202 can thus determine whether redirection occurs before the print command of the large size is transmitted. If redirection occurs, the HTTP communication module 202 can transmit the print command of the large size only to the transfer destination URL. If redirection does not occur, the HTTP communication module 202 can transmit the print command of the large size only to the printing apparatus 120. This can prevent the network resource from being largely wasted. An example of such processing will be described below with reference to FIG. 8. Note that the same step numbers as in FIG. 6 are added to the same processes as in FIG. 6, and a description thereof will be omitted.

In a case in which the transmission mode is the batch transmission mode, the HTTP communication module 202 obtains the information of the size of the print command (step S615), and determines whether the size is a predetermined size or more (step S801). Upon determining that the size of the print command is less than the predetermined size (NO in step S801), as in FIG. 6, the HTTP communication module 202 transmits an HTTP request including the print command to the transmission destination URL obtained in step S602 (step S617). On the other hand, upon determining that the size of the print command is the predetermined size or more (YES in step S801), the HTTP communication module 202 transmits an HTTP request that does not include the print command to the transmission destination URL obtained in step S602 (step S802). Then, the HTTP communication module 202 receives an HTTP response from the transmission destination URL (step S803), and analyzes the status code, thereby determining whether the HTTP response is a redirect response (step S804). Upon determining that the received HTTP response is a redirect response (YES in step S804), the HTTP communication module 202 updates the transmission destination URL to a transfer destination URL included in the redirect response (step S805). After that, the HTTP communication module 202 transmits the print command stored in the memory in step S616 to the transmission destination URL (step S617).

According to this processing example, even when the print application 201 selects the batch transmission mode and inputs a print command of a predetermined size or more to the HTTP communication module 202, the presence/absence of a redirect response can be detected before the start of transmission of the print command. As a result, it is possible to avoid transmitting a print command of a predetermined size or more a plurality of times and prevent the network resource from being wasted.

Processing Example 3

In Processing Examples 1 and 2, an example has been described in which whether redirection occurs is determined by transmitting an HTTP request to the URL of a transmission destination and doing the determination based on whether an HTTP response is received. In this processing example, when redirection occurs, the URL of a transmission destination and the URL of a transfer destination are stored in association with each other. After that, an HTTP request is transmitted not to the URL of the transmission destination but to the URL of the transfer destination. This can prevent occurrence of unnecessary HTTP request transmission and HTTP response reception. An example of such processing will be described below with reference to FIGS. 9A and 9B. Note that the same step numbers as in FIG. 6 or 8 are added to the same processes as in FIG. 6 or 8, and a description thereof will be omitted.

The HTTP communication module 202 searches information stored in a transfer destination URL database for the information of the transmission destination URL obtained in step S602 (step S901), and determines whether the transmission destination URL is registered (step S902). FIG. 10 shows an example of the transfer destination URL database. As shown in FIG. 10, a transmission destination URL to which the HTTP communication module 202 transmits an HTTP request and a transfer destination URL included in a consequently received redirect response are registered in a transfer destination URL database 1001 in association with each other. The HTTP communication module 202 determines whether the transmission destination URL obtained in step S602 is registered as a transmission destination URL in the transfer destination URL database 1001.

Figure 8:
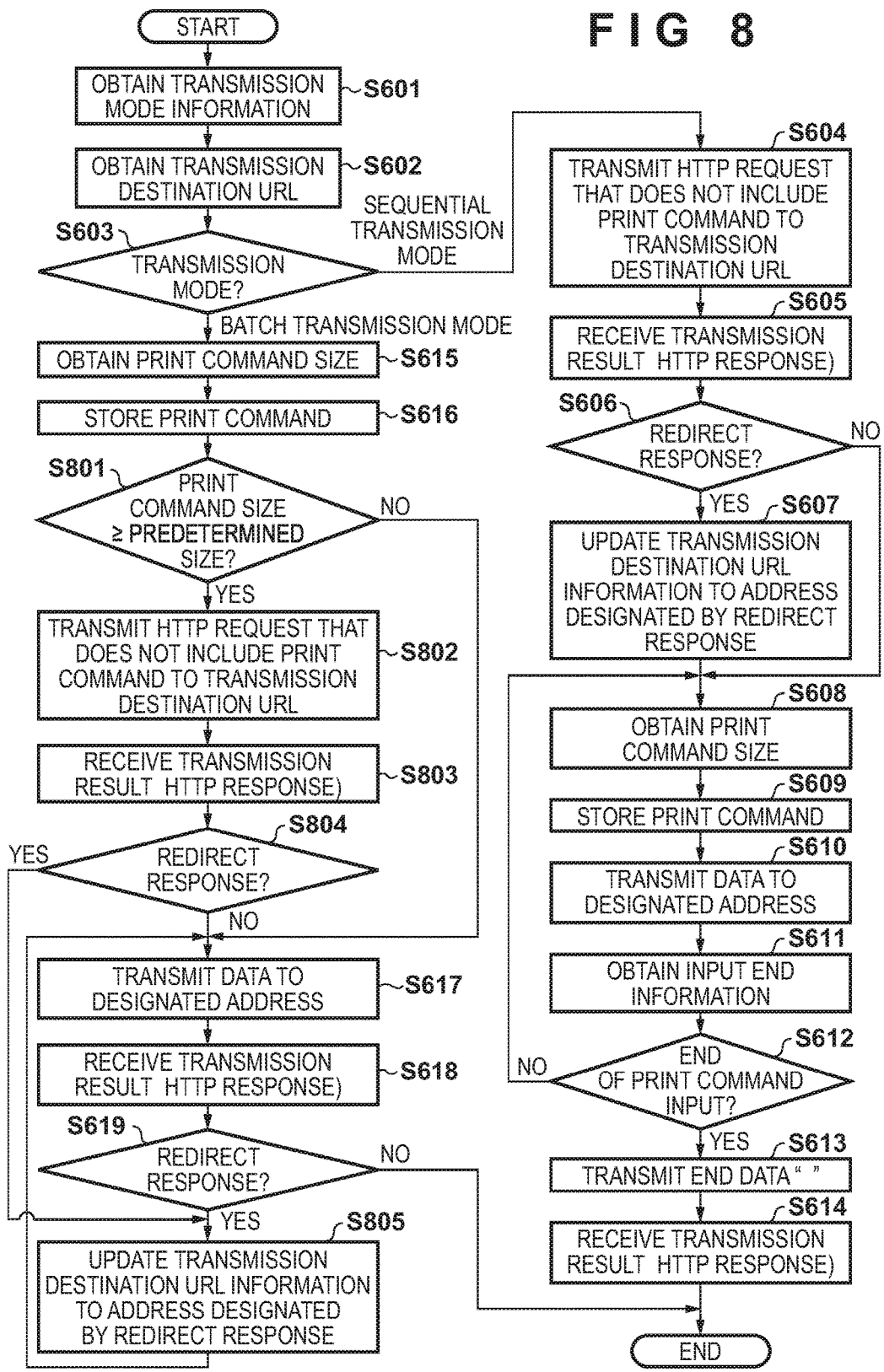
FIG. 8 is a flowchart showing the second example of processing of the HTTP communication module.
Figure 9B:
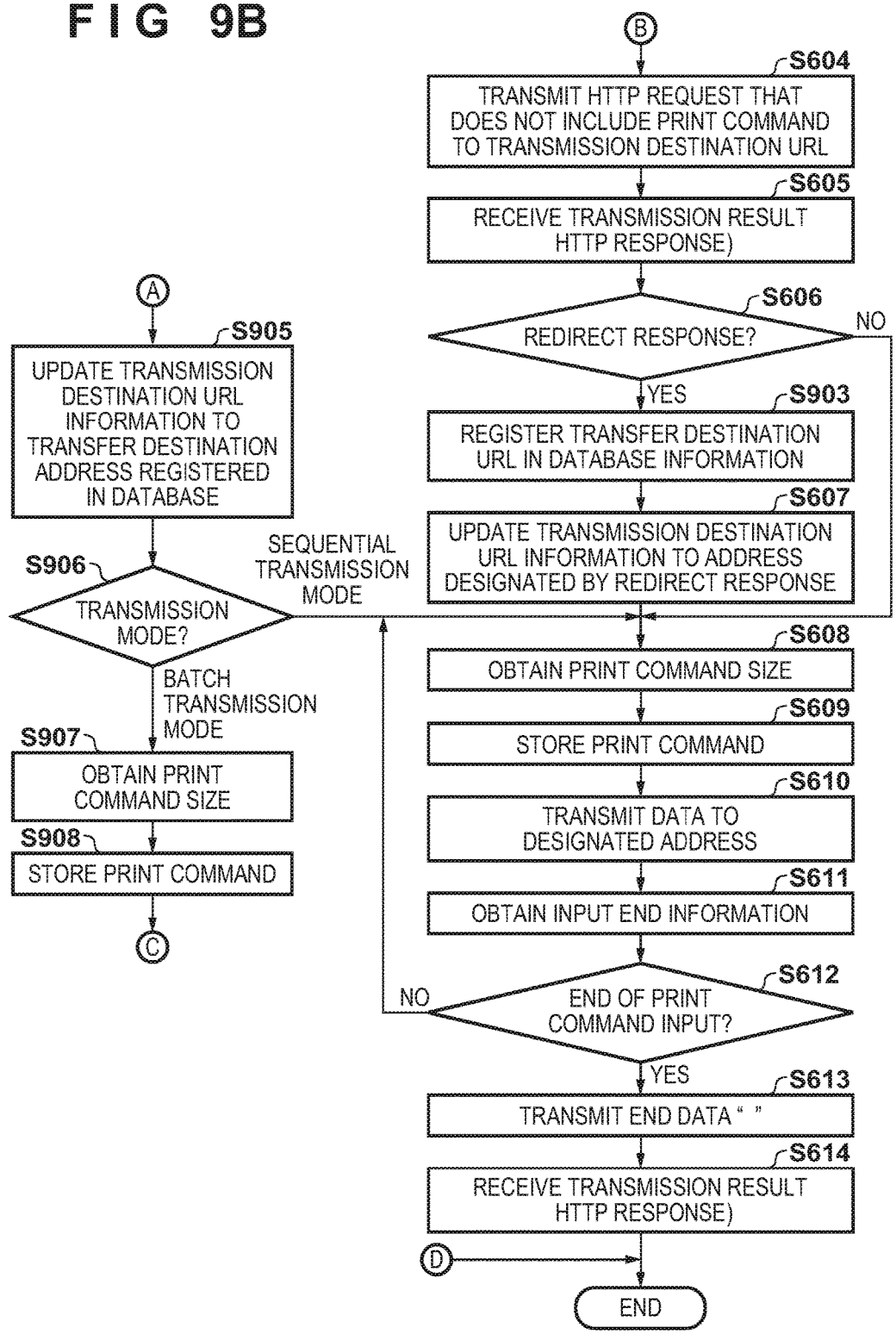

If the transmission destination URL is not registered in the transfer destination URL database (NO in step S902), the HTTP communication module 202 executes the same processing as that from step S603 in FIG. 8. However, if a redirect response is received as a result of execution of the same processing as in FIG. 8, the HTTP communication module 202 registers the transmission destination URL and the transfer destination URL in the transfer destination URL database in association with each other (steps S903 and S904), and then transmits the print command to the URL of the transfer destination. On the other hand, if the transmission destination URL is registered in the transfer destination URL database (YES in step S902), the HTTP communication module 202 updates the transmission destination URL to the transfer destination URL registered in the transfer destination URL database 1001 in association with the transmission destination URL (step S905). Then, the HTTP communication module 202 determines the transmission mode based on the information obtained in step S601 (step S906). Upon determining that the transmission mode is the sequential transmission mode, the HTTP communication module 202 advances the process to step S608. On the other hand, upon determining that the transmission mode is the batch transmission mode, the HTTP communication module 202 obtains the size information of the print command input from the print application 201 (step S907). Then, the HTTP communication module 202 reserves a memory area in accordance with the size obtained in step S907, stores the print command input from the print application 201 in the area (step S908), and advances the process to step S617.

As described above, in this processing example, when the HTTP communication module 202 transmits an HTTP request to a transmission destination URL and receives a redirect response, a transfer destination URL included in the response is registered in the transfer destination URL database. This allows the HTTP communication module 202 to transmit an HTTP request to the URL of the transfer destination after that without transmitting the HTTP request to the transmission destination URL. Since this also prohibits transmission of an HTTP request that does not include print data, use of the network resource can further be suppressed.

Note that in Processing Example 3 described above, the description has been made assuming that if the transmission destination URL is not registered, the same processing as in Processing Example 2 is executed. However, the same processing as in Processing Example 1 may be executed. In addition, the above-described processing shows an example in a case in which HTTP is used but can also be applied to a case in which a communication protocol other than HTTP is used. That is, a communication apparatus that uses an arbitrary communication protocol can be configured to transmit, to a transmission destination, a predetermined signal that does not include data used to confirm whether change of a transmission destination is required in a case in which a predetermined condition concerning data transmission is satisfied. Note that the predetermined condition can be, for example, a condition that the data transmission mode is a predetermined mode to, for example, divisionally transmit data or a condition that the size of data is a predetermined size or more. Accordingly, when a condition that can lead to a waste of the memory capacity, the processing resource, or the network resource is defined as the predetermined condition, retransmission is not performed for data that satisfies the predetermined condition, and a waste of the resources can be suppressed. In addition, when the above-described predetermined signal is not transmitted for data that does not satisfy the predetermined condition, transmission of an unnecessary signal can be prevented in a case in which change of the transmission destination does not occur. Furthermore, as in processing example 3, in a case in which change of the transmission destination occurs, the communication apparatus stores the information of the transmission destinations before and after the change in association with each other. This makes it possible to transmit data to the transmission destination after the change without transmitting the data to the transmission destination registered as the transmission destination before the change. It is therefore possible to further suppress a waste of the resources.

In processing examples 1 to 3 described above, a print application that transmits a print command has been exemplified as an application that uses the HTTP communication module 202. However, an application that transmits data of another type can also be applied. For example, the above-described processing may be executed in a case in which a sheet information management application that transmits a sheet information command to add sheet information (sheet type, sheet size, and the like) to the printing apparatus is used. In addition, the above-described processing may be executed in a case in which a printing management application that transmits various kinds of information obtaining request commands to obtain status information, capability information, and job execution history information from the printing apparatus is used.

Other Embodiments

In the above-described embodiment, the information processing apparatus 110 and the printing apparatus 120 have been exemplified. However, the embodiment may be used in data communication between, for example, the information processing apparatus 110 and a web server. In this case, a web server corresponding to a transmission destination address before redirection and a web server corresponding to a transmission destination address after redirection may be different web servers.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-094084, filed May 10, 2017, which is hereby incorporated by reference herein in its entirety.

What is claimed is:

1. A communication apparatus comprising:
   a first transmission unit configured to transmit, to a first address, a communication request that does not include a content;
   a determination unit configured to determine whether a response representing transfer to a second address different from the first address is received as a response to the communication request that does not include the content; and
   a second transmission unit configured to transmit, if it is determined that the response representing transfer to the second address is received, the content to the second address and to transmit, if it is determined that the response representing transfer to the second address is not received, the content to the first address,
   wherein a communication partner apparatus with which communication is performed using the first address is the same as a communication partner apparatus with which communication is performed using the second address, and
   wherein the first transmission unit, the determination unit, and the second transmission unit are implemented using at least one processor.

2. The apparatus according to claim 1, wherein if a mode to sequentially transmit the content is executed, the communication request that does not include the content is transmitted to the first address.

3. The apparatus according to claim 1, wherein if a size of the content is not less than a predetermined size, the communication request that does not include the content is transmitted to the first address.

4. The apparatus according to claim 1, further comprising a storage unit configured to store the first address and the second address in a memory in association with each other if the communication apparatus receives a response including a transfer instruction to the second address as the response to the communication request that does not include the content to the first address,
   wherein if the second address is stored in association with the first address, the second transmission unit transmits the content to the second address without transmission of the communication request that does not include the content by the first transmission unit, and
wherein the storage unit is implemented using the at least one processor.

5. The apparatus according to claim 1, wherein the communication request that does not include the content is transmitted in accordance with http.

6. The apparatus according to claim 1, wherein the content includes at least one of a print command used in print processing by the communication partner apparatus, a sheet information command used to register sheet information in the communication partner apparatus, a status information obtaining request command used to obtain a status of the communication partner apparatus, a capability information obtaining request command used to obtain capability information of the communication partner apparatus, and an execution history obtaining request command used to obtain history information executed by the communication partner apparatus.

7. The apparatus according to claim 1, wherein the second address is an address based on https.

8. The apparatus according to claim 1, wherein the communication partner apparatus is a printing apparatus.

9. A control method of a communication apparatus, comprising:
transmitting, to a first address, a communication request that does not include a content;
determining whether a response representing transfer to a second address different from the first address is received as a response to the communication request that does not include the content;
transmitting, if it is determined that the response representing transfer to the second address is received, the content to the second address; and
transmitting, if it is determined that the response representing transfer to the second address is not received, the content to the first address,
wherein a communication partner apparatus with which communication is performed using the first address is the same as a communication partner apparatus with which communication is performed using the second address.

10. The method according to claim 9, wherein if a mode to sequentially transmit the content is executed, the communication request that does not include the content is transmitted to the first address.

11. The method according to claim 9, wherein if a size of the content is not less than a predetermined size, the communication request that does not include the content is transmitted to the first address.

12. The method according to claim 9, further comprising storing the first address and the second address in a memory in association with each other if the communication apparatus receives a response including a transfer instruction to the second address as the response to the communication request that does not include the content to the first address,
wherein if the second address is stored in association with the first address, the content is transmitted to the second address without transmission of the communication request that does not include the content.

13. The method according to claim 9, wherein the communication request that does not include the content is transmitted in accordance with http.

14. The method according to claim 9, wherein the content includes at least one of a print command used in print processing by the communication partner apparatus, a sheet information command used to register sheet information in the communication partner apparatus, a status information obtaining request command used to obtain a status of the communication partner apparatus, a capability information obtaining request command used to obtain capability information of the communication partner apparatus, and an execution history obtaining request command used to obtain history information executed by the communication partner apparatus.

15. The method according to claim 9, wherein the second address is an address based on https.

16. The method according to claim 9, wherein the communication partner apparatus is a printing apparatus.

17. A non-transitory computer-readable storage medium storing a computer program that causes a computer provided in a communication apparatus to:
transmit, to a first address, a communication request that does not include a content;
determine whether a response representing transfer to a second address different from the first address is received as a response to the communication request that does not include the content;
transmit, if it is determined that the response representing transfer to the second address is received, the content to the second address; and
transmit, if it is determined that the response representing transfer to the second address is not received, the content to the first address,
wherein a communication partner apparatus with which communication is performed using the first address is the same as a communication partner apparatus with which communication is performed using the second address.

18. The medium according to claim 17, wherein if a mode to sequentially transmit the content is executed, the communication request that does not include the content is transmitted to the first address.

19. The medium according to claim 17, wherein if a size of the content is not less than a predetermined size, the communication request that does not include the content is transmitted to the first address.

20. The medium according to claim 17, wherein the program further causes the computer to store the first address and the second address in a memory in association with each other if the communication apparatus receives a response including a transfer instruction to the second address as the response to the communication request that does not include the content to the first address,
if the second address is stored in association with the first address, the content is transmitted to the second address without transmission of the communication request that does not include the content.

21. The medium according to claim 17, wherein the communication request that does not include the content is transmitted in accordance with http.

22. The medium according to claim 17, wherein the content includes at least one of a print command used in print processing by the communication partner apparatus, a sheet information command used to register sheet information in the communication partner apparatus, a status information obtaining request command used to obtain a status of the communication partner apparatus, a capability information obtaining request command used to obtain capability information of the communication partner apparatus, and an execution history obtaining request command used to obtain history information executed by the communication partner apparatus.

23. The medium according to claim 17, wherein the second address is an address based on https.

24. The medium according to claim 17, wherein the communication partner apparatus is a printing apparatus.

* * * * *